United States Patent [19]

Schmidt et al.

[11] Patent Number: 4,611,881
[45] Date of Patent: Sep. 16, 1986

[54] OPTICAL APPARATUS FOR SCANNING RADIATION OVER A SURFACE

[75] Inventors: Erick Schmidt; Leonard E. Grenier; Steven Pallagi, all of Edmonton, Canada

[73] Assignee: General Systems Research, Ltd., Alberta, Canada

[21] Appl. No.: 736,005

[22] Filed: May 20, 1985

[51] Int. Cl.⁴ ............................................. G02B 26/10
[52] U.S. Cl. ...................................................... 350/6.9
[58] Field of Search ........................ 350/6.5, 6.9, 273; 358/206

[56] References Cited

U.S. PATENT DOCUMENTS

| 959,013 | 5/1910 | Howell | 350/6.5 |
|---|---|---|---|
| 3,668,984 | 6/1972 | Rosin . | |
| 3,813,146 | 5/1974 | Burch et al. . | |
| 3,879,615 | 4/1975 | Moser . | |
| 3,891,299 | 6/1975 | Rushing . | |
| 3,952,217 | 4/1976 | Rawlings . | |
| 3,977,764 | 8/1976 | D'Auria et al. . | |
| 4,099,829 | 7/1978 | Straayer . | |
| 4,168,126 | 9/1979 | Altman et al. . | |
| 4,264,203 | 4/1981 | Pirlet | 350/6.9 |
| 4,316,648 | 2/1982 | Lissack . | |
| 4,323,307 | 4/1982 | Seeley . | |
| 4,364,000 | 12/1982 | Burke, Jr. . | |
| 4,379,624 | 4/1983 | Miller et al. . | |
| 4,427,878 | 1/1984 | Buchtel et al. | 350/6.9 |

FOREIGN PATENT DOCUMENTS

| 1393535 | 5/1975 | United Kingdom . |
|---|---|---|
| 2097145 | 10/1982 | United Kingdom . |

Primary Examiner—John K. Corbin
Assistant Examiner—Loha Ben
Attorney, Agent, or Firm—Seidel, Gonda, Goldhammer & Abbott

[57] ABSTRACT

Optical apparatus for scanning radiation over a surface includes a plurality of angularly spaced rotating arms extending from a central axis. A central reflector is positioned at the axis of the arms and a radially remote reflector is positioned on each arm for folding an optical radiation path toward the object to be scanned. The central reflector rotates with the arms but is sequentially indexed into optical path alignment with each radially remote reflector so that a beam of radiation in the optical path is scanned over the same predetermined arcuate segment by each of the remote reflectors.

21 Claims, 6 Drawing Figures

OPTICAL APPARATUS FOR SCANNING RADIATION OVER A SURFACE

BACKGROUND OF THE INVENTION

This invention relates to optical apparatus for scanning a beam of radiation over a surface. More particularly, this invention relates to rotary optical apparatus for continuously scanning radiation, particularly coherent radiation, over a surface as that surface is advanced through the path of the radiation.

There are a myriad of devices for optically scanning a beam of radiation. Typically, such apparatus either scan the radiation by displacing a reflector in a plane at a fixed angle or provide an arcuate scan by rotating the reflector. U.S. Pat. No. 3,769,488 discloses a laser cloth cutting system in which a beam of coherent radiation is scanned over a cloth cutting area by planar x-y displacement of a pair of optical reflectors. The coherent radiation could be scanned by use of a rotating reflector but the problem of maintaining focus of the radiation on the cloth is difficult and requires even more complex mechanisms.

Regardless of whether the scanning reflector is displaced in a plane or rotated, there are inherent problems which must be overcome. Apparatus for displacing the reflector in a plane must necessarily be operated intermittently as the amount of displacement has to be finite. This means that the system must provide means for accelerating the reflector to the operating velocity, decelerating it, reversing its direction and repeating the process. This necessarily presents significant design problems, especially as the demand for higher velocities and more accurate positioning have to be met.

The use of a continuously rotating scanning reflector does not provide a ready solution to the problem. The reflector will be inoperative during a significant portion of its revolution unless the surface being scanned is also circular. Multi-faceted reflectors can be used, but they are expensive and difficult to accurately construct even though they can be continously rotated. Moreover, they do not eliminate the focusing problem mentioned above. Maintaining focus is particularly critical when dealing with coherent radiation.

Significant improvements can and have been made in methods and apparatus for accurately scanning radiation by planar displacement of a reflector. For example, the apparatus disclosed in U.S. Pat. No. 3,769,488 has been improved by using linear induction motors operated under the control of a computer and digital circuitry. Velocities of 40 to 60 inches per second have been achieved. But the laws of physics inevitably limit the amount of improvement that can be obtained using this approach. Reducing mass to obtain greater acceleration and positional accuracy makes the system prone to vibration and other extraneous forces. Yet as lasers have become more powerful and reliable, there is a greater demand for higher scanning velocities and ever more accurate positioning of the beam of radiation.

The problem of scanning optical radiation necessarily involves considerations of energy control as well as the rate of delivery especially when the beam is coherent radiation being used to manufacture products by burning or ablating material from an object. Good resolution can be obtained at a high production rate when the spot size is small. This requires apparatus that maintains precise focus throughout the scan at spot sizes from, 0.001 inch down to 12 microns. This requires the use of lenses at low f numbers, such as f 0.5 when focusing coherent infrared radiation. Such lenses have short focal lengths and practically no depth of field. Consequently, the optical scanning apparatus must be capable of positioning the scanning lens close to the object and scanning without deviation from the scan path.

The present invention provides a solution to the problem of accurately scanning radiation, particularly coherent radiation of higher velocities and greater accuracy.

The reflectors are angularly spaced from each other and positioned radiallly outward from the axis of rotation by rigid arms or equivalent structure such as a disk.

BRIEF SUMMARY OF THE INVENTION

In accordance with the present invention, a plurality of optical reflectors and associated focusing lenses are continuously rotated about a central axis. In the disclosed embodiment, the reflectors are supported at equal angles from each other and at equal radial distances from the axis of rotation, but they need not be at equal angles or radial distances. A central reflector is mounted at the axis of rotation, and together with any one of the radially remote reflectors defines a folded optical path for directing radiation toward the object to be scanned. The central reflector is rotatably mounted so that it can be rapidly turned in a direction counter to the direction of rotation of the remote reflectors. The central reflector is sequentially indexed into optical alignment with each remote reflector. Thus, the central reflector rotates in optical alignment with a remote reflector through a predetermined arcuate segment. Thereafter, it is rapidly brought into alignment with the next following remote reflector (i.e. flies back) and rotates through the same arcuate segment with that reflector. This process is repeated with each remote reflector. As a result the beam of radiation is repeatedly scanned over an arcuate segment. Appropriate means are provided for passing the object to be scanned through the path of the beam of radiation reflected from the remote reflectors.

The advantage of this scanning apparatus is that remote reflectors can be continuously rotated at a high scanning velocity (e.g. 250 inches/sec). There is no need to accelerate and decelerate relatively massive objects. Moreover, the support structure for the reflectors may be made rigid enough to be capable to withstand vibration and other extraneous forces, and it can also support the relatively heavy reflectors and lenses used for coherent radiation, particularly infrared radiation which tends to heat and distort the reflectors unless they are made relatively massive.

The need for repetitive acceleration and deceleration is largely eliminated. The central reflector rotates with the remote reflectors but is sequentially indexed in a counter rotative direction into optical path alignment with each reflector. Although the central reflector must be rapidly displaced there is no need for providing a precise velocity of displacement. The problem is reduced to turning the central reflector into precise optical alignment with each remote reflector at a predetermined angular position. This can be accomplished by using available equipment such as a stepping motor and accurate electronic controls. It is not nearly as difficult to sequentially rotate the central reflector through approximately the same angle or a set of angles as it is to accurately control the x-y position and velocity of a reflector or reflectors.

As noted above, the remote reflectors need not be at equal angles from each other or at equal radial distances from their access of rotation. By using a stepping motor controlled by a microprocessor, it is a straightforward matter to program in the set of angles through which the central mirror must be turned in order to bring it into optical alignment with the following remote mirror. Nor is it necessary that the mirrors be at equal radial distances from their axis of rotation. If they are at equal radial distances, then they will scan over the same arc. But if they are at different radial distances, then each mirror will scan over an arc spaced at some predetermined distance from the arc scanned by one or more of the other remote mirrors.

Although this optical scanning apparatus provides an arcuate scan, this presents no special problem in controlling the radiation on the surface of the object, whether it be for cutting a pattern in cloth, metal or wood, for forming an image on light sensitive material, or for any other reason. The radiation is switched on and off by the same known devices. Switching is electronically controlled in response to preprogrammed patterns or optical scanning apparatus which effectively digitize the surface into segments approximately equal to the beam width. Accordingly, for scanning purposes an arcuate scan is treated no differently than a linear path.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF AN EXEMPLARY EMBODIMENT OF THE INVENTION

Figure 1:
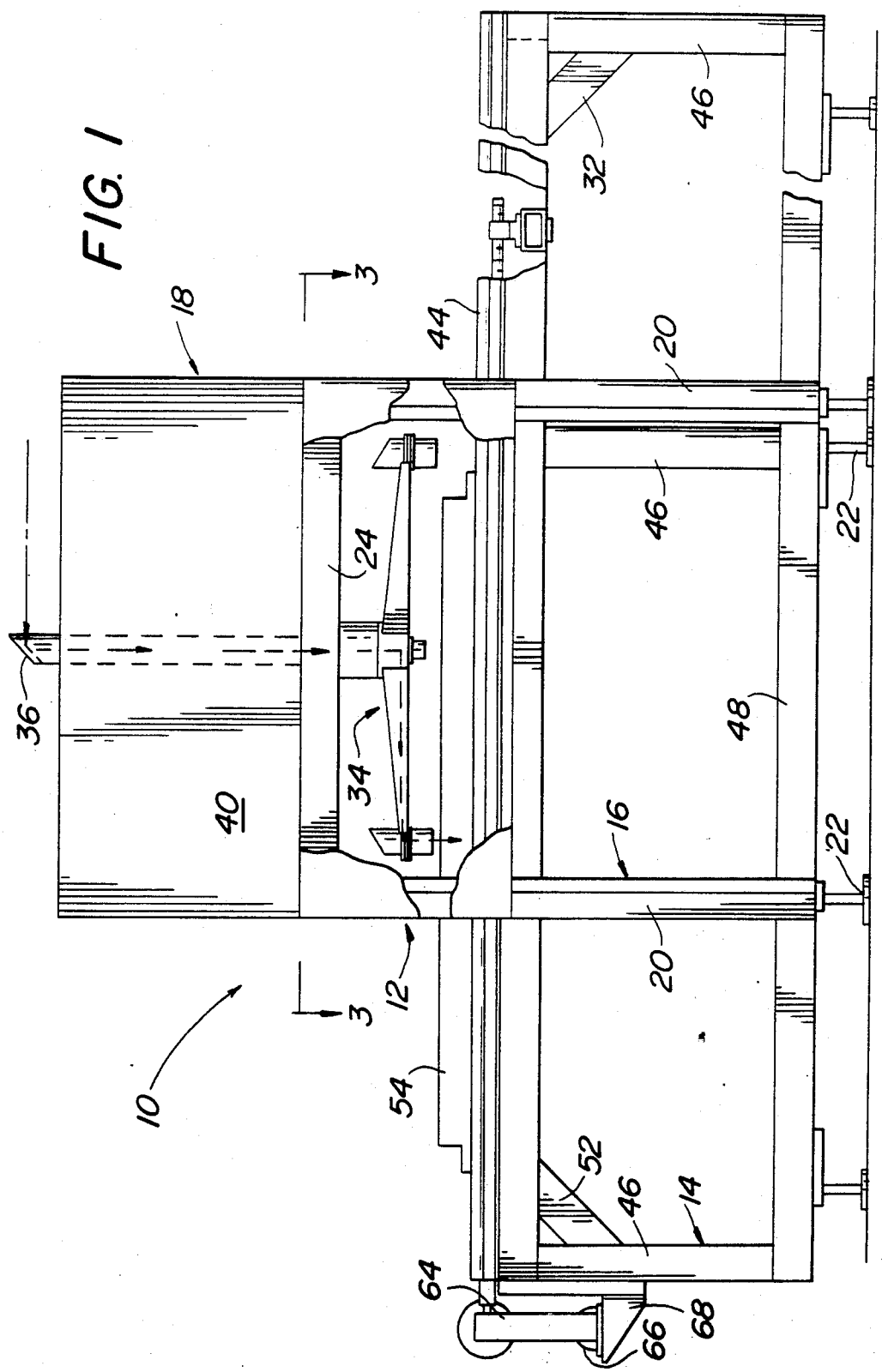
FIG. 1 is a side elevation of the optical apparatus for scanning radiation over a surface.

Referring now to the drawings in detail, wherein like numbers indicate like elements, there is shown in FIG. 1 an optical apparatus for scanning radiation over a surface designated generally as 10.

In general, the optical scanning apparatus 10 includes a reflector support assembly 12 and a feeder table 14. As suggested by their names, the reflector support assembly 12 provides a rigid support for the rotating reflectors, and the feeder table 14 functions to advance the object being scanned through the beam of optical radiation directed toward it by rotating reflectors mounted on the reflector support assembly 12.

The reflector support assembly includes a table 16 upon which is mounted a top reflector support 18.

The table 16 comprises four upright legs 20 mounted on adjustable leveling mechanisms 22 and supporting horizontal edge beams 24 and diagonal beams 26 at their upper ends. The legs, edge beams and cross beams are joined by suitable welds and reinforced by corner plates 28. The legs 20 are also joined at their bottom ends by lower cross beams. In order to provide good rigidity for the table 16, the structural members making up all of the beams are preferably steel box beams, although other cross-sectional shapes which resist bending and vibration can be used. For example, the beams may be 2 by 3 inches rectangular boxes made of $\frac{1}{4}$ inch thick mild steel. Appropriate corner braces (not shown) may be welded into position where the upright legs join the various horizontal beams, as required. Although not shown, it should also be noted that the diagonal beams 26 are not joined to each other at the center of the table 16. Rather, they are joined to the periphery of a ring 32 (see FIG. 4) upon which is mounted the bearing and other support structure for the rotary reflector assembly 34.

Figure 2:
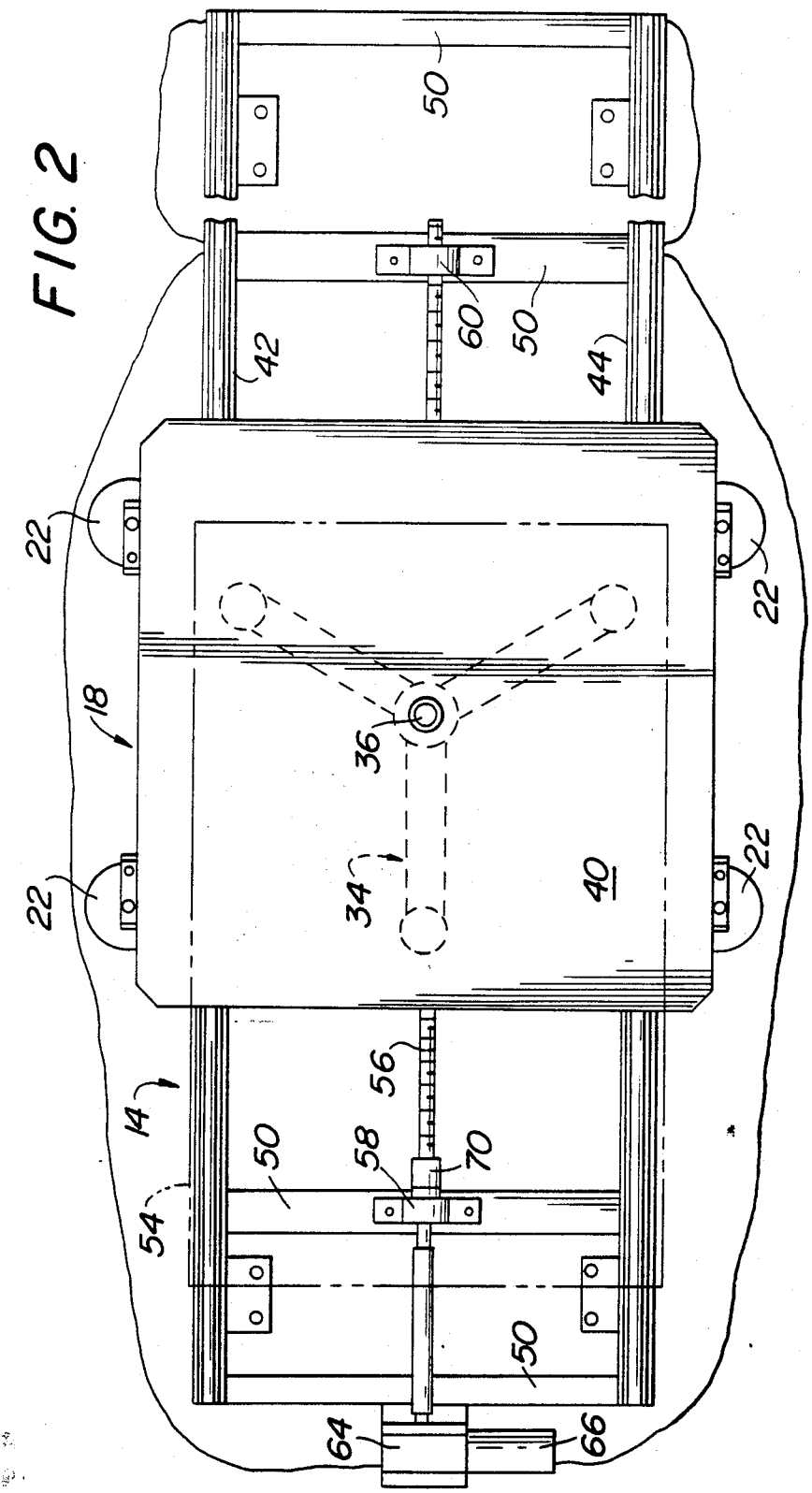
FIG. 2 is a top plan view of the apparatus.
Figure 3:
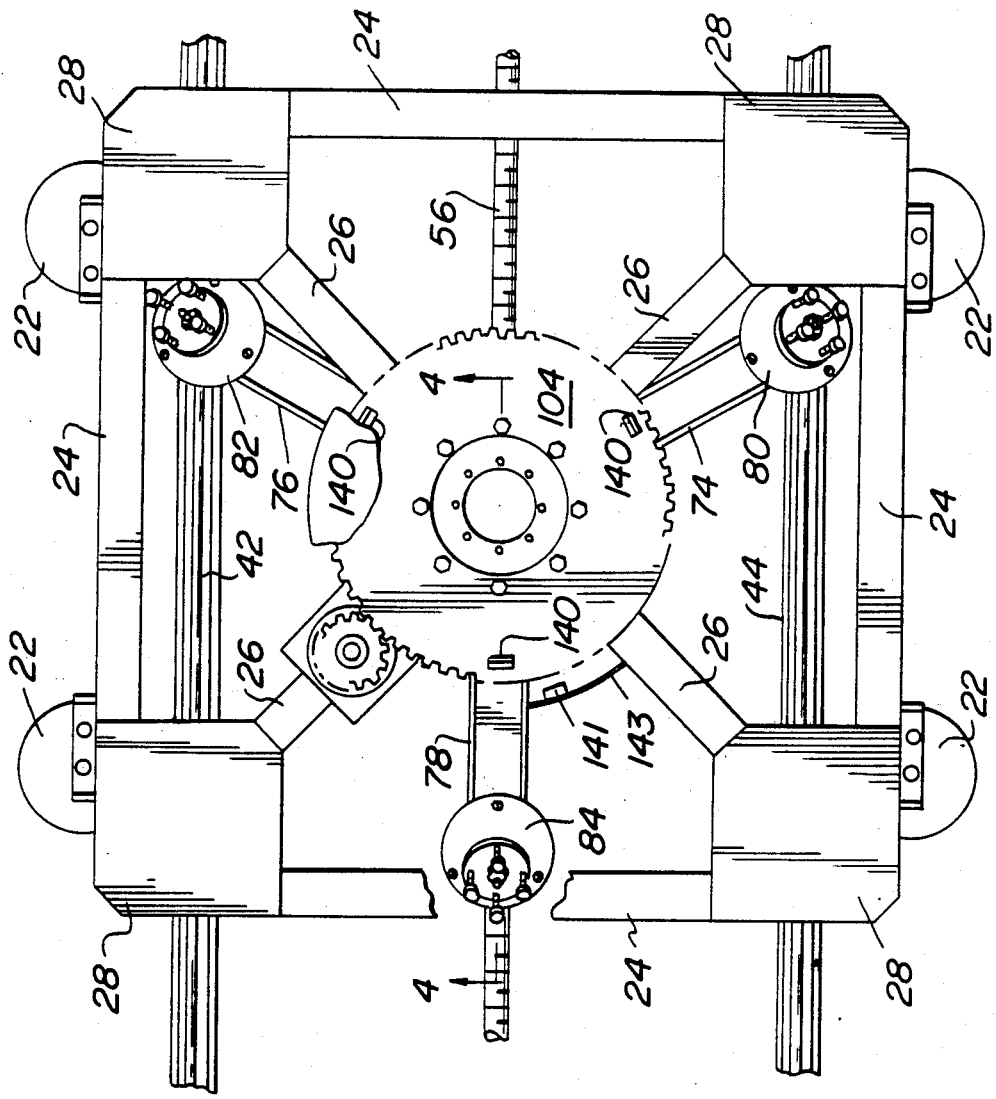
FIG. 3 is a section of the apparatus taken along the line 3—3 in FIG. 1.

The top reflector support 18 comprises four upright legs removably attached to the legs 20 (by plates matching plate 28) and appropriate top edge beams for supporting the cover panels 40 as shown in FIGS. 1 and 2. A diagonal cross beam (not shown) supports the top reflector 36 positioned to which direct radiation from a source (not shown) into the optical scanning apparatus 10.

In a preferred form, the source of radiation is a laser, and in particular a $CO_2$ laser for generating coherent infrared radiation. Of course, other sources coherent or incoherent radiation could be used although the system is primarily intended for use with coherent radiation.

The structural members which make up the top reflector support 18 are shaped like those used for the table 16 so as to provide a rigid support for the top reflector 36. The cover panels 40 provide shielding and a closed environment from which gaseous emissions resulting from burning, ablation or other operations on the object being scanned can be readily removed by an exhaust mechanism (not shown). Doors or other access mechanisms (not shown) can be provided in the panels 40.

The reflector support assembly straddles the feeder table 14 which includes a pair of rails 42 and 44 rigidly supported on upright legs 46 and lower longitudinal beams 48. Appropriate upper and lower cross beams 50 are also provided together with braces 52 so as to provide a rigid structure for supporting and accurately advancing the object to be scanned through a radiation path. As in the case of the table 16 and top reflector support 18, the structural members for the feeder table 14 are $\frac{1}{4}$ inch thick rectangular box beams approximately 2 by 3 inches made of mild steel in cross section.

The rails 42 and 44 support a pallet 54 for longitudinal displacement beneath the rotary reflector assembly 34. The object to be scanned may be fixed to the pallet 54 by any appropriate means.

The pallet 54 is driven by a ball screw 56 mounted in bearings 58 and 60 on cross beams 50. The screw 56 is rotatably driven by a shaft 62 connected to the speed reducer 64 which in turn is connected to the pallet motor 66 mounted on the bracket 68. The screw 56 extends through the ball screw 70 which is fixed to the bottom of the pallet 54. Consequently, rotation of the screw 56 drives the pallet 54 longitudinally along the rails 42 and 44 and hence through the path of the radiation directed onto it by the rotary reflector assembly 34 as explained below.

Figure 4:
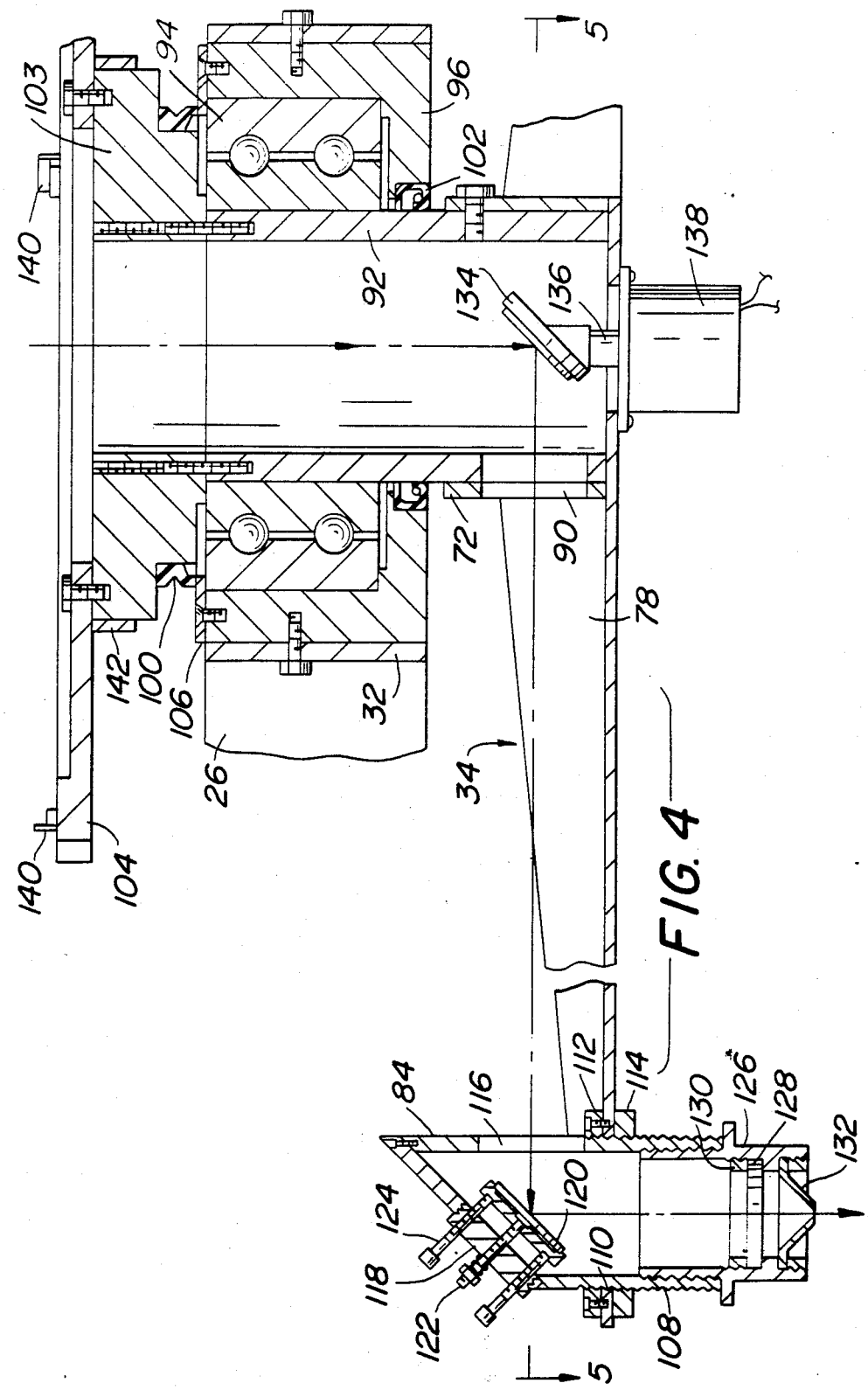
FIG. 4 is a section taken along the line 4—4 in FIG. 3 showing details of the central and remote reflectors as well as one of the support arms therefor.
Figure 5:
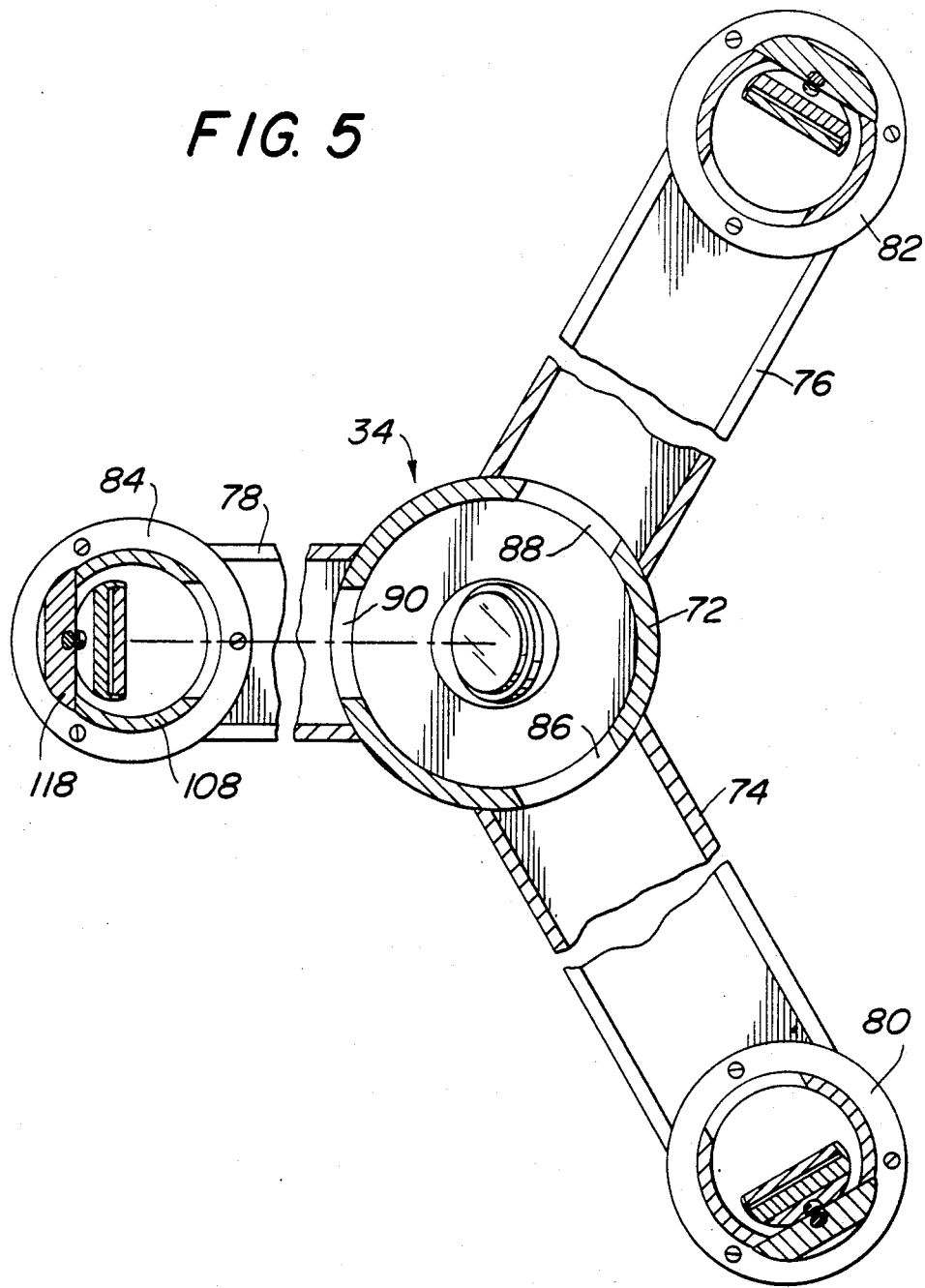
FIG. 5 is a section taken along the line 5—5 in FIG. 4.

As best shown in FIGS. 4 and 5, the rotary reflector assembly 34 includes a hub 72 to which are joined the three arms 74, 76 and 78 at approximately equal angles. It should be understood that although this invention is exemplified by the rotary reflector assembly 34 that includes three arms and remote reflectors, there is no fundamental reason why the invention could not be operated with two, four or more arms and reflectors.

Each of the arms 74, 76 and 78 is preferably channel shaped in cross section to provide rigid support for the reflector and focusing head assemblies 80, 82 and 84 mounted at their distal ends, respectively. The arms 74, 76 and 78 are welded or otherwise fixed to the hub 72 which is provided with openings 86, 88 and 90 through which optical radiation may pass in the manner hereinafter to be described.

The hub 72 is bolted or otherwise fixed to the shaft 92 which is fixed to the inner race of the bearing 94 mounted in the bearing housing fixed to the ring 32 by bolts or other appropriate screw fasteners. The bearing housing 96 also supports the seals 100 and 102 as shown. Seal 102 provides a seal between the bearing housing 96 and the shaft 92. Seal 100, supported on retaining ring 106, provides a rotary seal between the bearing housing and the gear support 103 fixed to the shaft 92. Gear support 103 supports the spur gear 104 fixed to it by threaded fasteners as shown.

From the foregoing, it is apparent that rotation of the spur gear 104 rotates the shaft 92 within the bearing 94 thereby rotating the arms 74, 76 and 78 together with the reflector and focusing head assemblies 80, 82 and 84.

Each of the reflector and focusing head assemblies 80, 82 and 84 is constructed in the same way. Accordingly, only a detailed description of the reflector and focusing head assembly 84 is provided with the understanding that such description is to serve as a description of the other two reflector and focusing head assemblies. Each reflector and focusing head assembly is positioned in an arm at the same radial distance for the central rotary axis of the assembly 34.

As illustrated in FIG. 4, the reflector and focusing head assembly 84 comprises a threaded sleeve 108 mounted in an opening 110 at the end of the arm 78. Assembly 84 is adjustably held in place by the threaded reinforcing ring 112 and the internally threaded tightening ring 114. Optical radiation passes through the opening 116 facing the opening 90 in hub 72. The upper end of the focusing head assembly 84 is cut a 45° angle to receive the reflector mount 118. Reflector mount 118 adjustably supports the reflector 120 which may be made of mirrored glass or other suitable material for reflecting radiation downwardly toward the pallet 54 upon which held the object being scanned. The reflector 120 is centrally joined to a spring biased adjustable screw 122 by means of a ball joint or other flexible mechanism. The angle of the reflector 120 is precisely adjusted by means of the thumb screws 124 which bear against the back of the reflector.

The reflector and focusing head assembly 84 is provided with an adjustable lens holder 126 within which is mounted the lens 128 by means of the retaining ring 130. A focusing nozzle 132 is positioned just below the lens 128. As illustrated, the lens holder 126 is threadedly mounted in the sleeve 108. Accordingly, the focus of the lens 128 can be precisely adjusted to accomodate variations such as the thickness of the object supported on the pallet 54. The focusing nozzle 132 protects the lens 128 as much as possible from smoke, splashes and other by products of the cutting, burning or other operations being performed on the object being scanned.

The rotary reflector assembly 34 also includes a central reflector 134 mounted at a 45° angle on the shaft 136 of the stepping motor 138 which is fixed to the bottom of the hub 72. The motor 138 rotates with the assembly 34.

Although not shown in detail, the top reflector 36 is constructed in a manner similar to the reflector and focusing head assembly 84 except no lens holder or lens is provided. Also not shown because to do so conveys no useful information, the spur gear 104 supports most of the electronic controls which therefore rotate with it. These controls include a stepping motor controller, a power supply and electronic interface circuitry. The spur gear may also support a compressor for supplying air or other cooling gases to the reflector and focusing head assemblies 80, 82 and 84 as well as the central reflector 134.

The spur gear also supports three switches 140, such as Hall effect switches, which provide timing pulses for the stepping motor controller. In a preferred embodiment, the switches 140 move past a fixed magnet 141 on bracket 143 to provide the timing pulses.

Power for the various electronic components is preferably provided by brushes (not shown) mounted on the cross beams 26 and slidingly engaged with the slip ring 142 fixed on the outer periphery of the gear support 103.

It should be apparent from the foregoing that a folded optical radiation path is provided by the reflectors described above. Thus, a beam of radiation emitted by an appropriate source, such as a laser, is reflected by the top reflector 36 down to the central reflector 134 mounted on the shaft of the stepping motor 138. Central reflector 134 is mounted at a 45° angle and normally faces one of the reflectors 120 at the end of the arms 74, 76 or 78. Optical radiation thus passes from the reflector 134 and is reflected downwardly by a reflector 120 set at a 45° angle to the path of the radiation. The radiation passes through the lens 128 and is focused on an object carried by the pallet 54. The pallet 54 is normally advanced either continuously or intermittently, as required, through the radiation reflected from any one of the reflectors 120. The manner in which the pallet is advanced is determined by an appropriate electronic control system for driving the pallet motor 66 and hence the screw 56.

Since it is desired that the radiation continuously scan the object mounted on pallet 54, the mirror 134 must be sequentially, optically aligned with the mirrors 120. This is accomplished by turning the mirror 134 into sequential optical path alignment with the mirrors 120 by means of the stepping motor 138. The electronic circuitry for accomplishing this illustrated in FIG. 6.

In operation, the rotary reflector assembly 34 is rotated in a relatively high velocity. By way of example, it may be rotated at a speed such that the optical beam is scanned at the rate of 250 inches per second. This compares quite favorably with the typical x-y reciprocating system for moving an optical beam in a plane which operates at approximately 40 to 60 inches per second. The rotary reflector assembly is continuously rotated by a motor at appropriate gearing engaged with the spur gear 104.

Since the optical scanning apparatus 10 is to repetitively scan the optical beam over the same arcuate distance, the central reflector 134 must be sequentially aligned with each of the reflectors 120. This is accomplished at the end of each arcuate by rapidly turning the central reflector 134 counter to the direction of rotation of the rotary reflector assembly. More particularly, the central reflector is rapidly turned from optical path alignment with one of the remote reflectors 20 to the next remote reflector upon completion of an arcuate scan. This is a kind of optical flyback system wherein the central reflector is rapidly turned back to optical alignment with the next succeeding mirror upon the completion of each arcuate scan.

Flyback or turning of the central reflector 134 is provided by the stepping motor 138 under the control of an appropriate electronic circuit. The stepping motor 138 requires a predetermined number of steps to turn the central reflector 134 through a full revolution relative to the arms 74, 76 and 78. Since there are three arms, the number of steps per revolution is divided into three parts which are stored in an appropriate memory, such as a read only memory (ROM). These parts are sequentially read out of memory and delivered to the stepping motor as required. The stepping motor responds by rapidly repositioning itself in optical alignment with each of the remote reflectors 120 within the reflector and focusing head assemblies 80, 82 and 84.

By way of example, but not limitation, the stepping motor 138 could require 200 steps for a full revolution at 1.8° per step. There are three arms in the exemplary optical scanning apparatus 10. This means that the arms cannot be exactly 120° apart since 200 steps is not exactly divisable by three. This is not necessarily a disadvantage because an unequal number of steps between each arm permits operation of a system without the necessity for a feedback control to keep track of where the central mirror is.

More specifically, the 200 steps per revolution can be divided into two sets of 67 steps and one set of 66 steps to complete the revolution of a mirror. Since the same set of steps occur in the same sequence during each revolution, a memory system permits the control apparatus to keep track of the control mirror without the necessity for feed back control. It is no particular disadvantage that the remote reflectors 120 are not exactly 120° apart since the pallet 54 will be transporting objects of different widths in any case.

In operation, a read only memory is operatively associated with the stepping motor 138. Appropriate circuitry sequentially loads into the stepper motor controller the next number of steps, i.e. 66 or 67 steps, stored in the ROM. Thereafter, the number of steps is executed, then the load and execute sequence is repeated. The actual circuitry for loading the memory, and executing the number of steps is not shown as it is conventional and not itself a part of this invention.

Figure 6:
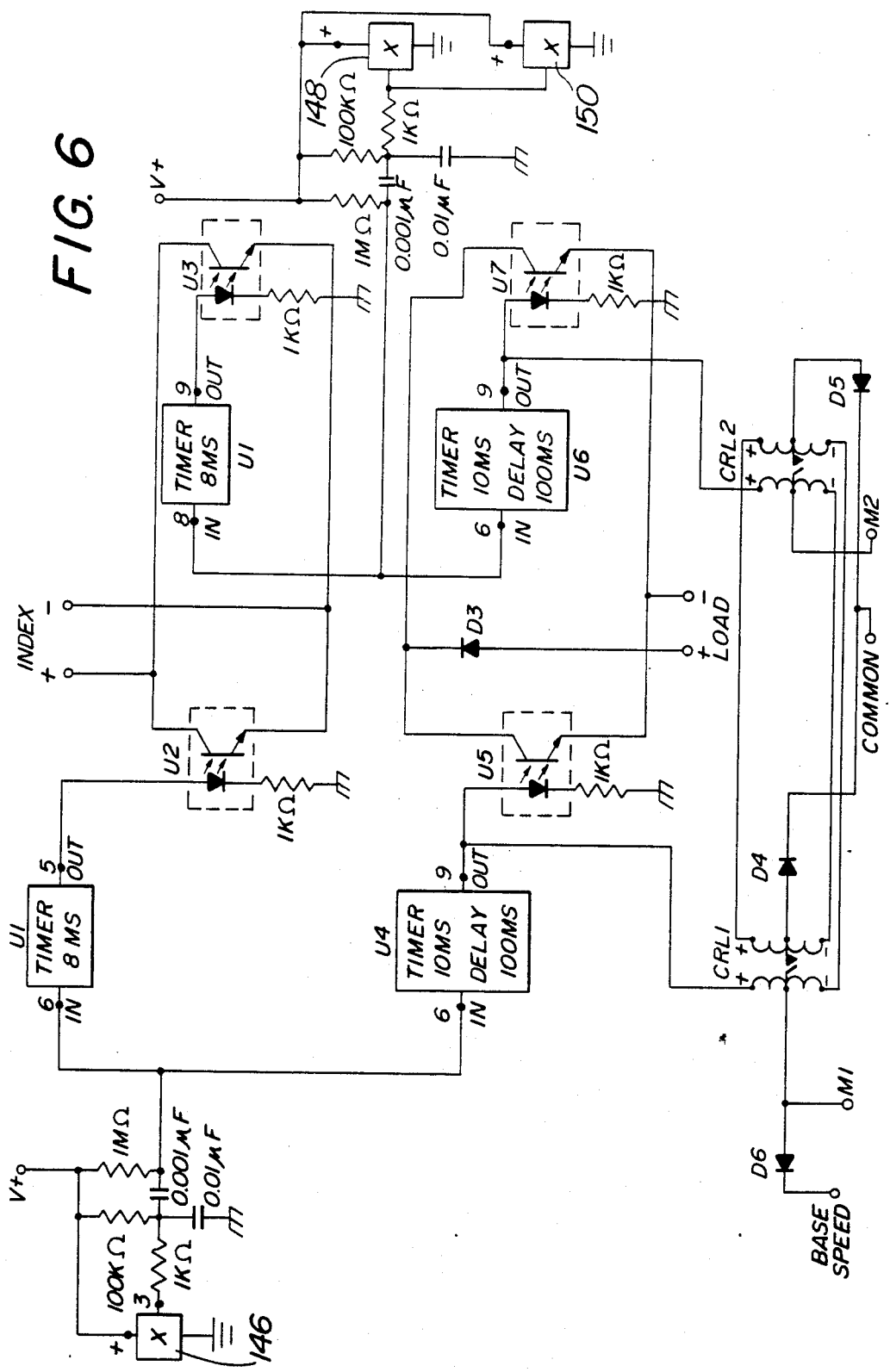
FIG. 6 is a schematic circuit for controlling the rotation of the central reflector.

FIG. 6 illustrates the control circuitry for directing the ROM load and execution in response to the rotation of the rotary reflector assembly. The control circuitry includes three Hall effect switches 146, 148 and 150. Hall effect switches 148 and 150 are commonly connected for triggering the two like sets of 67 steps. Hall effect switch 146 triggers the movement of the stepping motor by 66 steps.

As shown, Hall effect switch 146 is connected through appropriate filtering circuitry to input pin 6 of the eight millisecond solid state timer U1. It is also connected to input pin 6 of the ten millisecond timer U4 with a one hundred millisecond delay. Hall effect switches 148 and 150 are connected through appropriate filter circuits to the input pin 8 of the 8 millisecond timer U1 and the input pin 6 of the ten millisecond timer U6 with 100 millisecond delay. Timers U1, U4 and U6 are conventional monostable or one shot timers. The Hall effect switches 146, 148 and 150 are sequentially triggered as they move past the fixed magnet 141 mounted on arcuate bracket 143.

Pin 5 output of timer U1 places an optically isolated signal on the base of NPN transistor U2. Pin 9 output of timer U1 places optically isolated signal on the base of NPN transistor U3. The pin 9 output of timer U4 places an optically isolated signal on the base of NPN transistor U5, and in a like manner that pin 9 output of timer U6 places an optically isolated signal on the base of NPN transistor U7.

From the foregoing, it should be apparent that the 8 millisecond timer U1 controls the index address I/O part in the memory for the stepping motor 138. It should also be apparent that the timers U4 and U6, respectively, control the load address I/O part in the memory. Timer U4 and hence NPN transistor U5 respond to Hall effect switch 146 as do the 6-5 pins of timer U1. Timer U6 and the 8-9 pins of the timer U1 respond to either one of the Hall effect switches 148 or 150.

The function of the index address is to tell the memory to execute the previously stored number of steps which in this case is either 66 or 67 steps. The function of the load address is to instruct the memory to load the next number of steps for the stepping motor after a 100 microsecond delay.

Since there are two possible sets of numbers of steps to load through M1 and M2, it is necessary to instruct the memory as to which of the two sets is to be loaded. This function is provided by the relay memory consisting of relays CRL 1 and CRL 2. The function of the relay memory is to remember which state the system was previously in and switched it to the other state if required.

As shown, the relays CRL 1 and CRL 2 are triggered by their respective timers U4 or U6 and remain latched until the other relay is triggered by its timer.

It should be apparent from the foregoing that an optical scanning apparatus constructed in accordance with the principles of the present invention provides an improved means for delivering a beam of optical energy to the surface of an object at a high scanning velocity while maintaining good resolution and controlling beam intensity. A system constructed in accordance with the principles of the present invention has been operated at scanning velocity of 250 inches per second as compared to 40 to 60 inches per second scanning velocities for x-y scanners known to the inventors. The present invention is capable of maintaining a small spot size (e.g. 0.001 inch) at a low f number (e.g. f 0.5). The apparatus allows the optical beam to be scanned close to the surface.

The disclosed embodiment of the invention clearly illustrates that it is not necessary for the remote reflectors to be spaced at equal angles from each other. Indeed, they are not so spaced in the disclosed embodiment although they do approximate equal spacing within one step of the stepping motor 138. But plainly, the stepping motor can be programmed to turn the central reflector through any predetermined angle to bring it into alignment with a remote reflector.

It should once again be noted that the remote reflectors need not be positioned at equal radial distances from their axis of rotation. For example, their radial distances could vary by one beam width from each other. In this way, one complete rotation of the reflectors through 360° would lay down adjacent arcuate scans on the workpiece. This may be advantageous where it is desirable to hold the object fixed while it is being scanned. In such a system it would be necessary to advance the object only once for each rotation rather than once for each scan by a remote mirror. In such a scheme, the radial relationships would be as follows:

$$r_n = r_1 + (n-1)\Delta r$$

where:
$r_n$ is the radius from the central mirror to the remote mirrors $r_1, r_2, r_3, r_4, \ldots$
n is the number of mirrors.
$r_1$ is the shortest radius from the central mirror to a remote mirror.
$\Delta r$ = one desired line width or one beam width.

Such a system would be particularly advantageous where the rotary speed of the arms is so fast that it is difficult to advance the table.

The optical scanning apparatus 10 is ruggedly constructed. All of the metal beams have a cross sectional shape that resists bending and is relatively impervious to vibration and other outside forces. Tests have indicated that the optical scanning apparatus 10 can be operated for significant lengths of time without requiring adjustment. In one test, the apparatus was operated during business hours for one month without requiring adjustment. In another test it was operated during business hours for one month at 1.8 times its operating velocity without significant variations in its velocity.

The present invention may be embodied in other specific forms without departing from the spirit or essential attributes thereof and, accordingly, reference should be made to the appended claims, rather than to the foregoing specification, as indicating the scope of the invention.

We claim:
1. Optical apparatus for scanning a beam of radiation over a surface, comprising:
a rigid reflector support assembly,
a plurality of regularly spaced arms extending from a central axis, said arms being rotatably mounted on said reflector support assembly,
motive means for rotating said arms about said central axis,
a central reflector mounted at said central axis and rotatable with said arms,
a reflector fixed on each of said arms at a radial distance remote from said central axis,
said central reflector being positioned to fold an optical radiation beam path toward said remote reflectors, and said remote reflectors being positioned to fold the optical radiation beam path toward the surface of the object to be scanned,
mounting means for said central reflector including central reflector rotating means for turning said central reflector about the central axis relative to said remote reflectors,
said central reflector turning means including means to index said central reflector in a direction counter to the direction of rotation of said remote reflectors and sequentially into optical path alignment with each remote reflector prior to that remote reflector traversing a predetermined arcuate segment of rotation,
whereby a beam of radiation in the optical path is effectively scanned over a predetermined arcuate segment by each of the remote reflectors.

2. Optical apparatus for scanning a beam of radiaton over a surface in accordance with claim 1,
including means for supporting the object to be scanned, and
means to advance the object through the radiation path.

3. Optical apparatus for scanning a beam of radiation over a surface, in accordance with claim 1 wherein:
said central reflector is turned by a stepping motor, and
said stepping motor is mounted at the junction of said arms.

4. Optical apparatus for scanning a beam of radiation over a surface, in accordance with claim 1 wherein each of said remote reflector is optically associated with means for focusing said radiation on the object to be scanned.

5. Optical apparatus for scanning a beam of radiation over a surface, in accordance with claim 1 wherein said reflector support assembly and said arms are made rigid by structural members whose cross sectional shape makes them relatively stiff and resistant to bending.

6. Optical apparatus for scanning a beam of radiation over a surface in accordance with claim 1 wherein:
each of said arms is fixed to a central hub, and
said motive means comprises a motor and gearing operatively engaging said motor with said hub.

7. Optical apparatus for scanning a beam of radiation over a surface in accordance with claim 1 wherein:
said apparatus includes at least three arms and three remote reflectors, and
said predetermined arcuate segment is approximately equal to the angular distance between said arms.

8. Optical apparatus for scanning a beam of radiation over a surface in accordance with claim 1 including
sensing means for determining when an arm and its associated remote reflector have rotated through said predetermined arcuate segment, and
means responsive to said sensing means for precisely indexing said central reflector from optical path alignment with one of said remote reflectors to optical path alignment with a following reflector.

9. Optical apparatus for scanning radiation over a surface in accordance with claim 1 including a fixed optical reflector mounted on said reflector support assembly, said fixed reflector being positioned to fold the optical radiation path toward said central reflector.

10. Optical apparatus for scanning radiation over a surface in accordance with claim 1 wherein said remote reflectors are mounted on said arms at approximately equal arcuate distances from each other.

11. Optical apparatus for scanning radiation over a surface in accordance with claim 1 wherein said remote reflectors are fixed on said arms at equal radial distances from said central axis.

12. Optical apparatus for scanning a beam of radiation over a surface, comprising:
a central reflector and a plurality of radially remote reflectors,
means for supporting said central reflector and remote reflectors for rotation about an axis,
said central reflector normally being in optical path alignment with one of said remote reflectors for arcuately scanning a beam of radiation in the optical path defined by said reflectors, and turning means for indexing said central reflector about the central axis of rotation counter to the direction of rotation of the remote reflectors sequentially into optical path alignment with each remote reflector prior to that remote reflector traversing a predetermined arcuate segment of its path of rotation, whereby a beam of radiation in the optical path is effectively scanned over a predetermined arcuate segment by each of the remote reflectors.

13. Optical apparatus for scanning radiation over a surface in accordance with claim 12, including:

means for supporting the object to be scanned, means to advance the object through the radiation path, and means to position said remote reflectors in close proximity to the object being scanned.

14. Optical apparatus for scanning radiation over a surface in accordance with claim 13, including:

focusing means optically associated with each remote reflector for focusing the radiation on the surface to be scanned.

15. Optical apparatus for scanning a beam of radiation in accordance with claim 12, including:

a stepping motor for turning said central reflector, and said stepping motor being mounted for rotation with said central reflector and said remote reflectors.

16. Optical apparatus for scanning a beam of radiation in accordance with claim 12 wherein:

said remote reflectors are mounted on arms extending from a central hub coaxial with the axis of rotation, and each of said arms having a cross sectional shape which makes them relatively stiff and resistant to bending.

17. Optical apparatus for scanning a beam of radiation over a surface in accordance with claim 15, including:

sensing means for determining when a remote reflector has rotated through a predetermined arcuate segment, and means responsive to said sensing means for indexing said central reflector from optical path alignment with one of said remote reflectors to optical path alignment with a following remote reflector by causing said stepping motor to move through a predetermined number of steps.

18. Optical apparatus for scanning a beam of radiation over a surface in accordance with claim 12 wherein said remote reflectors are rotated at relatively high velocities.

19. Optical apparatus for scanning a beam of radiation over surface in accordance with claim 12 wherein said remote reflectors are at equal radial distances from said axis of rotation.

20. Optical apparatus for scanning a beam of radiation over a surface in accordance with claim 12 wherein said remote reflectors are at predetermined different radial distances from said central axis of rotation.

21. Optical apparatus for scanning a beam of radiation over a surface in accordance with claim 12 wherein said remote reflectors are positioned at predetermined different arcuate distances from each other.

* * * * *